Patented Mar. 20, 1945

2,371,957

UNITED STATES PATENT OFFICE 2,371,957

PLASTICIZED POLYVINYL ACETAL COMPOSITION

Elmer R. Derby, Springfield, Mass., assignor to Monsanto Chemical Company, St. Louis, Mo., a corporation of Delaware No Drawing. Application October 23, 1941, Serial No. 416,203

3 Claims. (Cl. 260—36)

This invention relates to a polyvinyl acetal resin modified with novel agents and more particularly to such a resin modified with novel plasticizers.

This application is a continuation-in-part of my copending application Serial Number 172,443, filed November 2, 1937.

An important embodiment of my invention relates to improvements in the manufacture of laminated safety glass and particularly to the production of a plastic interleaf material having the necessary physical properties to fulfill the commercial and technical requirements. A satisfactory laminated glass must give satisfactory break tests, both hot and cold, this term being used in the ordinary significance with which it is employed in the trade. The plastic interleaf material must have satisfactory light and water resistance; stability; i. e., resistance to change by reason of age; clarity; color; adhesion to glass; and satisfactory hardness at the temperature of use. Perhaps the most satisfactory base material at the present time is a partial polyvinyl acetal resin, i. e., a material made by condensing an aldehyde with a hydrolyzed polyvinyl ester, such a resin being described in the patent to Morrison et al., Reissue No. 20,430, dated June 29, 1937. These resins are conveniently called polyvinyl acetal resins. These resins vary in the degree of hydrolysis of the ester and the degree of combination of the aldehyde. For instance, the molecules of a satisfactory resin made with formaldehyde may be considered to be made up of 82% acetal, 8% hydroxyl groups figured as polyvinyl alcohol and 10% acetate. Another satisfactory resin contains for example 2% or less of acetate, 16 to 20% hydroxyl groups figured as polyvinyl alcohol and the balance acetal formed with butyraldehyde. The resins, of which the foregoing are only two examples, have different properties according to the proportion of the three substituents mentioned and the particular aldehyde employed. It will be understood that variations in the chemical composition of the resins employed may be compensated for by the choice of suitable plasticizer and the amount used. The effect of the acetate in the resin appears to be to give a sharp melting point affecting the hot break test; therefore, the proportion of acetate should be kept low. The hydroxyl groups appear to give a long softening point and to increase the amount of plasticizer required. The hydroxyl groups also increase the susceptibility of the final material to water, although this may be offset to some extent by the character of the aldehyde employed in the formation of the acetal. It has also been suggested that the hydroxyl groups increase the capacity of the final product to adhere to glass. The properties of the final product can be regulated by varying the proportions of the three components in the resin, and this can be accomplished in the course of manufacture of the resin.

However, as is well known to those skilled in the art, the properties of plastic material for laminated glass made fom partial polyvinyl acetal resin as a base, depend on the character and amount of the plasticizer employed about as much as on the resin itself, and the utilization of these resins has been seriously retarded by the extreme difficulty of discovering a suitable plasticizer which for a particular resin, when used in the necessary amounts, will give to the final product the optimum qualities. These plasticizers are usually heavy esters, i. e. the esterification products of the glycols, polyglycols, monobasic alcohols and glycerol with monobasic aliphatic acids, phthalates or dibasic aliphatic acids, tribasic acids, or phosphoric acid; but not all such substances can be used with the resins in question, or in sufficient quantities to produce appreciable or satisfactory results. Accordingly, it has been necessary to do a large amount of experimental work to determine what plasticizer to use and the amount which with any given resin will produce the best plastic for laminated glass.

I have discovered that of a chemical series of plasticizers that one will give the best results which in the proportion necessary for good break tests is that one in the series of materials which is below but close to the point of incompatibility with the particular resin and yet is capable of permanent miscibility with it. I believe that in general the plasticizer which is next below the point of incompatibility will be best, but I find that in certain cases those which are immediately below in the series give usable but decreasingly good results. Therefore to determine which plasticizer of a given series shall be used it is well to make up small test batches with each of the plasticizers in the series, and to choose that plasticizer which is next in the series below the lowest which shows signs of exudation in the test batch. For instance, if the series of phthalates are under consideration and the batch made with diamyl phthalate shows slight signs of exudation then dibutyl phthalate which is next below in the series will be chosen and it will be found that a mixture in the same proportions made with this phthalate can be used and that it will give the best physical properties in the resulting plastic. Incompatibility makes itself manifest in the form of slight exudation after standing, the surface becoming oily or greasy, and in the appearance of haze due to the collection of tiny masses of the plasticizer which interfere with the transmission of light.

It is further found that certain plasticizers may be used in large amounts without segregation and certain others in small amounts. The plasticizer to be chosen should be one which can be mixed in a sufficient quantity to have an appreciable effect on the final product. The amount of plasticizer to be used can be determined from the results of break tests, on laminated glass made with the particular plastics in question. A convenient method is to make up several batches of the material with increasing percentages of plasticizer, then make both hot and cold break tests and plot the results against the percentage of plasticizer to resin. The curve of the hot break test will usually be found to drop off rapidly as the amount of plasticizer is increased, while the curve of the cold break test will be found to rise sharply with the increase in plasticizer up to a certain point and then will drop sharply again. If an amount of plasticizer is employed which corresponds closely to the point where the two curves first cross each other, it will be found that the material thus produced has the best combination of physical properties for the purpose intended.

I have discovered that with certain resins now available the best results may be obtained as follows:

*Polyvinyl acetal resin made with butyraldehyde*

For resins of this character having proportions of 16 to 20% hydroxyl groups figured as polyvinyl alcohol, 0 to 2% acetate, and the balance acetal, the following plasticizers in the amounts specified give the best results:

(1) *Dibutyl diglycollate.*—Satisfactory results may be obtained with from 30 to 50 parts of dibutyl diglycollate to 100 parts of the resin, but the best results are obtained when about 38 parts are employed.

(2) *Triethylene glycol dibutyrate.*—The range of satisfactory results is from 30 to 50 parts of the plasticizer to 100 parts of the resin. The best results are obtained with 40 parts.

(3) *Tributyl phosphate.*—The range is from 25 to 45 parts and the best results are obtained with 39 parts.

(4) *Diamyl phthalate.*—The range is 60 to 80 parts and the preferred amount 75 parts.

(5) *Dibutyl succinate.*—The range is from 50 to 70 parts and the preferred amount about 60.

(6) *Tributyl citrate.*—The range is from 70 to 100 parts with about 90 as the preferred amount.

(7) *Butoxy-ethoxy-ethyl butyrate.*—The range is from 40 to 60 parts and the preferred amount 50 parts.

(8) *Dibutyl thio-di-glycollate.*—The range is from 30 to 50 parts and the preferred amount 40 parts. Inasmuch as this plasticizer is the substantial equivalent of dibutyl diglycollate, both are intended to be included in the appended claims wherever either appears.

(9) *Ethyl laurate.*—The range is from 45 to 65 parts and the preferred amount 55 parts.

(10) *Di-ethoxy-ethyl phthalate.*—The range is from 70 to 90 parts and the preferred amount 80 parts.

*Polyvinyl acetal made with formaldehyde*

For resins of this character having proportions of about 82% of acetal, 8% of hydroxyl groups calculated as polyvinyl alcohol and 10% acetate, the following plasticizers and amounts give the best results.

(1) *Diethyl phthalate.*—The range is 90 to 110 parts of diethyl phthalate to 100 parts of the resin and the preferred amount is 100 parts of diethyl phthalate.

(2) *Diethylene glycol diproprionate.* — The range is from 50 to 70 parts and the preferred amount 60 parts.

(3) *Triethylene glycol dipropionate.* — The range is from 50 to 70 parts and the preferred amount 60 parts.

(4) *Benzoxy-ethoxy - ethyl propionate.*—The range is from 65 to 85 parts and the preferred amount 75 parts.

(5) *Di-ethyl succinate.*—The range is from 40 to 60 parts and the preferred amount 50 parts.

(6) *Di-methyl sebacate.*—The range is from 40 to 60 parts and the preferred amount 50 parts.

Although the substances specifically mentioned above are especially suitable for the particular purpose described above, this invention comprehends the use of those esters having from about 12 to about 17 carbon atoms of monobasic alcohols and monobasic aliphatic acids. Moreover, this invention especially embraces aliphatic esters of lauric acid; however, the lower alkyl laurates, such as ethyl, propyl, butyl, amyl, hexyl and octyl laurates, are preferred, especially for use with polyvinyl acetal resin made with butyraldehyde.

What is claimed is:

1. A plastic composition of matter comprising a polyvinyl acetal resin and, as a modifying agent therefor, ethyl laurate.

2. A plastic composition of matter comprising a polyvinyl butyraldehyde acetal resin and, as a modifying agent therefor, ethyl laurate.

3. A plastic composition of matter comprising a polyvinyl butyraldehyde acetal resin and from substantially 45 parts to substantially 65 parts ethyl laurate for each 100 parts of resin.

ELMER R. DERBY.